United States Patent [19]
Woolfolk

[11] Patent Number: 5,148,175
[45] Date of Patent: Sep. 15, 1992

[54] HIGH RESOLUTION VARIABLE RANGE GATE GENERATOR WITH PROGRAMMABLE TIMING

[75] Inventor: Thomas M. Woolfolk, Gordonsville, Va.

[73] Assignee: Sperry Marine Inc., Charlottesville, Va.

[21] Appl. No.: 726,064

[22] Filed: Jul. 5, 1991

[51] Int. Cl.⁵ .............................................. G01S 13/18
[52] U.S. Cl. .......................................... 342/95; 342/85
[58] Field of Search ................ 342/95, 94, 136, 85, 342/135

[56] References Cited

U.S. PATENT DOCUMENTS

| | | | |
|---|---|---|---|
| 3,682,553 | 8/1972 | Kapany | 342/180 X |
| 3,725,923 | 4/1973 | Bosc et al. | 342/107 |
| 3,768,097 | 10/1973 | Ziegler | 342/136 |
| 3,803,604 | 4/1974 | Case | 342/30 |
| 3,947,803 | 3/1976 | Brown | 342/378 X |
| 3,975,731 | 8/1976 | Latham et al. | 342/48 |
| 4,003,051 | 1/1977 | Fitzgerald et al. | 342/110 |
| 4,104,629 | 8/1978 | Isbister et al. | 342/43 |
| 4,125,835 | 11/1978 | Barry | 342/94 |
| 4,150,375 | 4/1979 | Ross et al. | 342/21 |
| 4,322,730 | 3/1982 | Chrzanowski | 342/15 |
| 4,328,496 | 5/1982 | White | 342/15 |
| 4,384,292 | 5/1983 | Prime, Jr. | 342/16 |
| 4,398,198 | 8/1983 | Dano et al. | 342/387 |
| 4,622,555 | 11/1986 | Doggett et al. | 342/84 |
| 4,675,678 | 6/1987 | Klingenschmitt et al. | 342/34 |
| 4,740,045 | 4/1988 | Goodson et al. | 342/112 |
| 4,816,834 | 3/1989 | Bjorke | 342/120 |
| 4,977,405 | 12/1990 | Nothnick | 342/162 |

*Primary Examiner*—John B. Sotomayor
*Attorney, Agent, or Firm*—Seymour Levine; Albert B. Cooper

[57] ABSTRACT

Range gate delay is effected by serially connected coarse and fine programmable delay lines. The radar transmit trigger pulse is propagated through the programmable delay lines to provide a delayed trigger pulse. The delayed trigger pulse triggers a range gate generator for generating the range gate. The delay effected by the coarse and fine programmable delay lines is controlled from the system CPU. The range gate generator comprises a D-type flip-flop with the Q output thereof connected as the input to a further programmable delay line. The delayed trigger pulse sets the flip-flop and the output of the further programmable delay line resets the flip-flop. The range gate is provided by the Q output of the flip-flop. The width of the range gate is determined by the delay set into the further programmable delay line by the system CPU.

7 Claims, 4 Drawing Sheets

HIGH RESOLUTION VARIABLE RANGE GATE GENERATOR WITH PROGRAMMABLE TIMING

BACKGROUND OF THE INVENTION

1. Field of the Invention

The invention relates to radar systems, particularly with respect to programmably controlling the range, range resolution and range gate width of an impulse radar system.

2. Description of the Prior Art

Baseband reflectometer impulse radar systems transmit a short burst of RF energy while the receiver is turned off. The receiver is then turned on at the appropriate time and for the appropriate length of time to examine a specified range for targets. Such an impulse radar system may, for example, be utilized as an intrusion detection and alert system.

Electromagnetic radiation travels at approximately one foot per nanosecond $10^{-9}$ seconds). For example, a transmitted pulse requires 100 nanoseconds to travel from the radar to a target at a distance of 100 feet / and another 100 nanoseconds to return from the tart to the radar. Thus, 200 nanoseconds are required for the round-trip pulse transit. For a receiver to detect such a target, the receiver is turned on after 200 nanoseconds have elapsed from the time the transmitter was fired, and is maintained on for a specified interval in order to receive the target return. To reduce false detections, the receiver is maintained off until the 200 nanoseconds from the time the transmitter was fired have elapsed. Similarly, for a target at a range of 150 feet, the time delay between firing the transmitter and enabling the receiver is 300 nanoseconds. Time delays appropriate for targets at different distances are determined by the one foot per nanosecond algorithm.

The interval of time that the receiver is enabled is denoted as the range gate. The width of the range gate determines the width of the range slice; i.e., the range resolution. For example, a ten foot range slice corresponds to twenty feet of round-trip path length and therefore requires a 20 nanosecond range gate. A five foot range slice provides finer range resolution and requires 10 nanoseconds of range gate time. In a system with a minimum and maximum range of interest, the narrower the range gate, the more slices exist into which to divide the range. Thus, the narrower the range gate, the finer is the resolution and the more precisely will a target be pinpointed. Prior art systems are, however, limited in producing a range gate of any particular width that will occur at controllable time intervals after firing the transmitter. Additionally, prior art systems are limited in generating sufficiently narrow range gates and hence range slices to provide high range resolution systems.

In the prior art, the time delay for each range slice is generated by counting down from preset numbers utilizing a high-speed clock. The range gate may also be generated utilizing this clock. Total range coverage is provided by a single clock in this manner since the range slices interrogated are contiguous with respect to each other. The total range is divided into equal slices, or bins, corresponding to the width of the range gate. Generally, the range gate is equivalent to one clock period and the time delay to any range bin is equal to an integral number of clock cycles.

As an illustrative example, a 100 foot range bin in a system utilizing a 20 nanosecond range gate is considered. As discussed above, a 20 nanosecond round-trip corresponds to a distance of ten feet, so that the 100 foot range bin spans the distance between 100 and 110 feet from the radar. Twenty nanoseconds is also the period of a 50 MHz clock. If the 100 foot range is divided by the width of a range bin, ten counts of the clock are required before enabling the receiver; i.e., a range delay count of 10. In this illustrative system, the count of 10 is loaded into a set of countdown counters and counting down is initiated upon firing the transmitter. When the count attains zero, the range gate is issued to enable the receiver for twenty nanoseconds in order to examine the ten foot bin. To interrogate the next range bin, the counters are loaded with the count of 11 and the sequence is repeated. In this manner, the entire range is interrogated, one range bin at a time.

The above is a simplified explanation of how prior art systems generate the range gate. If, however, the "one nanosecond per linear foot" rule were slightly inaccurate, or if there were an offset error due to a time delay between the transmit trigger and the actual transmitter firing, the only correction available in such systems would be to shift the count loaded for each range bin up or down. Such a fine correction would require an increase in the clock rate since a 50 MHz clock does not provide incremental corrections smaller than 20 nanoseconds. Additionally, if a range bin or target range resolution narrower than those described above were required, the only way to provide such increased resolution would be to increase the clock rate.

Such high clock rates are generally unattainable in practical circuitry utilizing present day technology. At 50 MHz, CMOS and most TTL is too slow. The absolute limit for Fast TTL is 100 MHz. In order to clock at these high speeds, ECL technology would be required which is expensive, necessitates careful circuit layout and utilizes excessive power compared to TTL and CMOS. The speed of ECL tops out between 125 and 150 MHz which yields a minimum range gate of 7 nanoseconds, or 3.5 feet of range resolution. To attain one foot of resolution by the above-described techniques would be prohibitive with present day digital circuitry.

The prior art also suffers from the problem that the clock speed, once selected, is fixed, and therefore the range gate and resolution are also fixed. There is no practical provision in the prior art for changing these parameters to accommodate different applications. It would be necessary to effect a hardware alteration, such as changing the clock system, in order to change these system parameters. Additionally, high speed clocks utilized in digital circuitry generate noise that has an adverse effect on the sensitivity of the radar detector.

SUMMARY OF THE INVENTION

The above disadvantages of the prior art are obviated by eliminating the requirements of utilizing a high-speed clock. This is accomplished by range gate generator apparatus for generating a range gate of predetermined width after a controllable time interval following a trigger pulse, the time interval being controllable by a first digital signal. The range gate generator comprises a first programmable delay generator responsive to the trigger pulse and to the first digital signal for delaying the trigger pulse in accordance with the first digital signal. A range gate generator coupled to the first programmable delay generator, generates the range gate in response to the delayed trigger pulse.

Preferably, the range gate generator generates a range gate of width controllable by a second digital signal, where the range gate generator comprises a second programmable delay generator. The second programmable delay generator is responsive to the delayed trigger pulse and to the second digital signal for generating a second delayed pulse in accordance with the second digital signal. The delayed trigger pulse defines the leading edge of the range gate and the second delayed pulse defines the trailing edge thereof.

Preferably, the programmable delay generators are implemented by programmable delay lines.

DESCRIPTION OF THE PREFERRED EMBODIMENT

Figure 1:
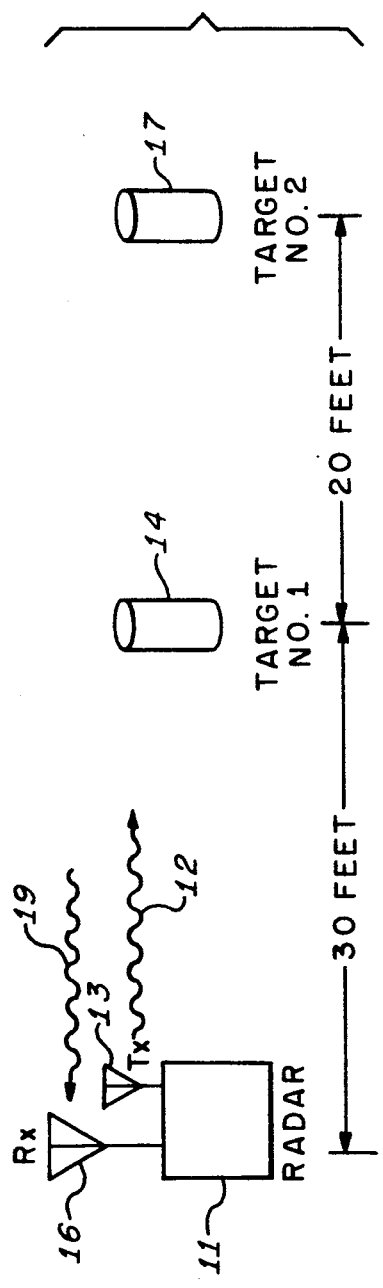
FIG. 1 is a schematic representation of a radar transmitter/receiver detecting representative targets.
Figure 1A:
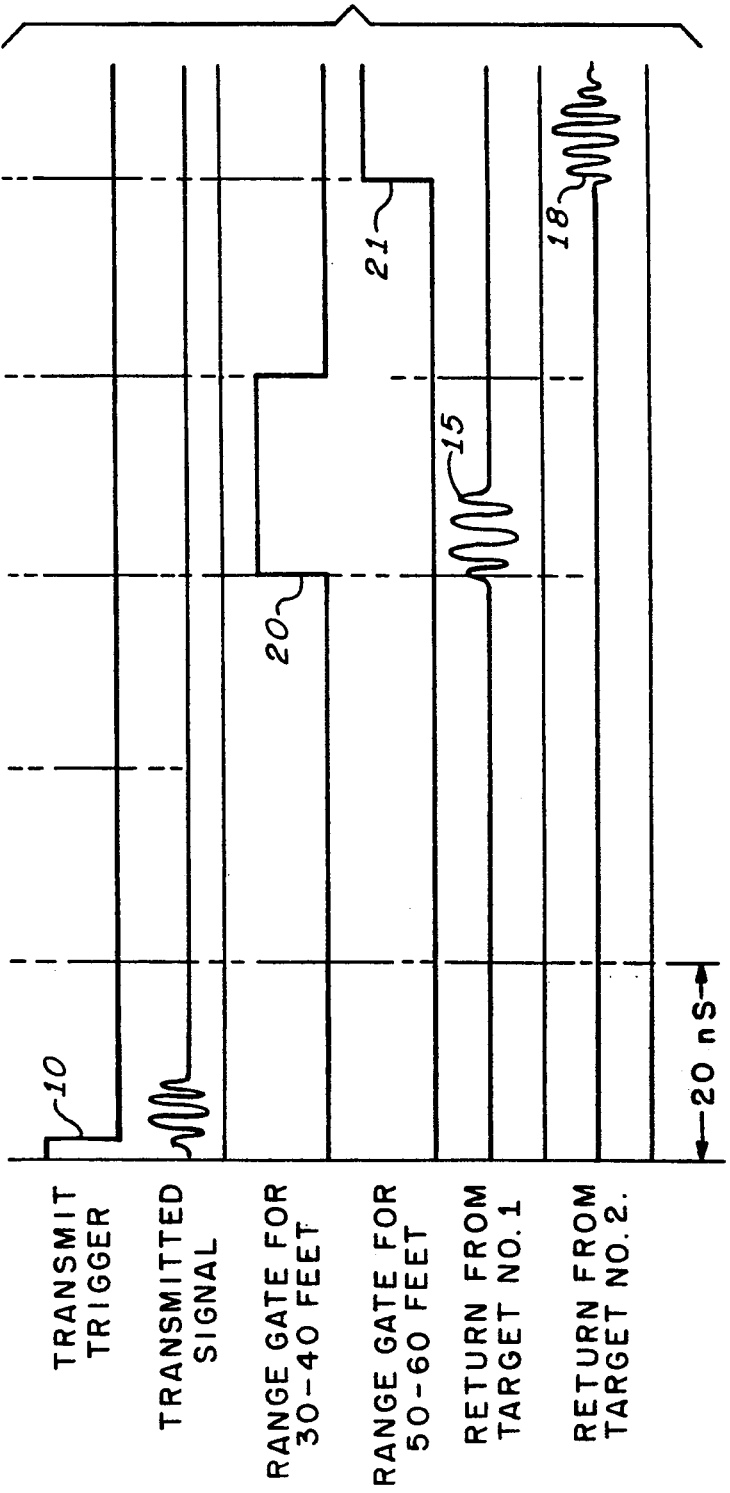
FIG. 1A is a chart of target detection timing waveforms pertinent to the system of FIG. 1.

Referring to FIGS. 1 and 1A, the operation of a typical baseband reflectometer impulse radar system is illustrated. In response to a transmit trigger 10, a radar system 11 radiates a transmitted signal 12 from a transmitting antenna 13. FIG. 1A illustrates the actual waveform of the transmitted signal 12 as it is radiated from the antenna 13. A target 14, illustratively located at thirty feet from the radar system 11, reflects a radar return signal 15 received at a receiving antenna 16. A further target 17, illustratively located at fifty feet from the radar system 11, reflects a radar return signal 18 which is received at the receiving antenna 16 at a later time than the return signal 15. The radar returns are generically illustrated as indicated by reference numeral 19. A range gate 20 enables a radar receiver in the radar system 11 to detect the target return signal 15. Similarly, a range gate 21 enables the radar receiver to detect the target return signal 18.

Figure 2:
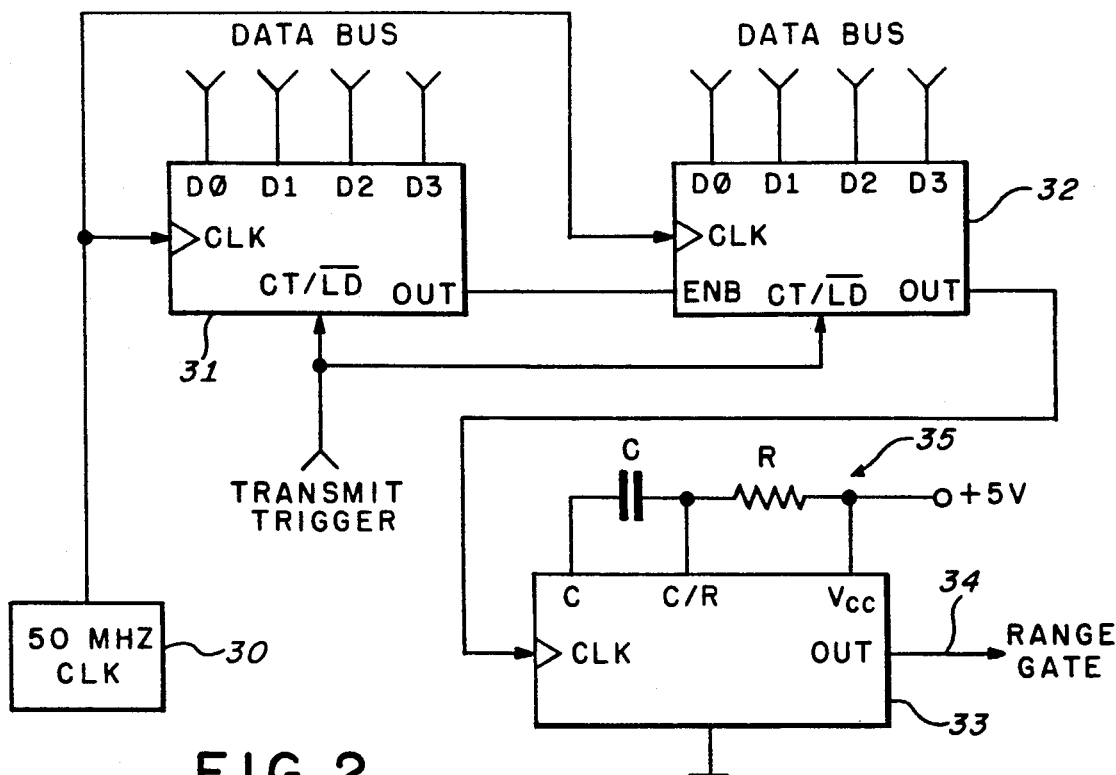
FIG. 2 is a schematic wiring diagram of synchronous range gate timing apparatus implemented in accordance with the prior art.

Referring to FIG. 2, a prior art circuit for providing synchronous range gate timing is illustrated. A high speed clock 30 (for example 50 MHz) provides the clock input to countdown counters 31 and 32. The counters 31 and 32 are preset from a system data bus. The transmit trigger is applied to the COUNT/LOAD (CT/LD) inputs of the counters 31 and 32. The overflow output from the counter 31 is applied to the enable input of the counter 32. The overflow output of the counter 32 clocks a monostable device 33 which provides the range gate on output 34 thereof. The R-C time constant of resistor-capacitor network 35 determines the range gate width. The clock period of the high speed clock 30, together with the preset of the counters 31 and 32, determine the range bin interrogated.

In operation of the prior art circuit of FIG. 2, a number controllable of the range bin to be interrogated is loaded into the countdown counters 31 and 32. The counters 31 and 32 count down to zero upon receipt of the transmit trigger signal at the CT/LD inputs thereof and the overflow output of the counter 32 triggers the monostable device 33. The output 34 of the monostable device 33 provides the actual range gate, with the pulse width thereof fixed by the time constant of the R-C network 35. The 50 MHz clock 30 provides the countdown rate and determines the range bin spacing, which at 50 MHz is ten feet (20 nanoseconds).

Figure 3:
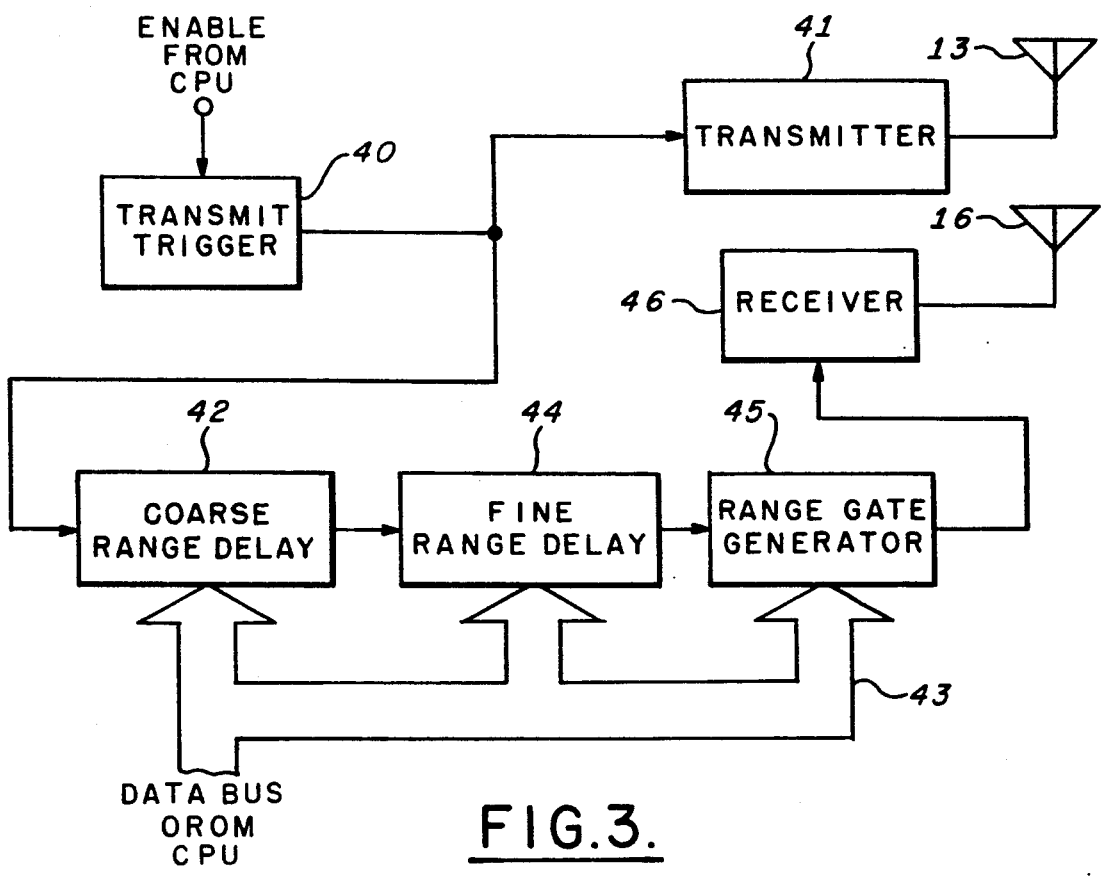
FIG. 3 is a schematic block diagram of asynchronous variable range gate timing apparatus implemented in accordance with the preferred embodiment of the present invention.

Referring to FIG. 3, a schematic block diagram for providing asynchronous variable range gate timing in accordance with the preferred embodiment of the invention, is illustrated. The radar system into which the circuit of FIG. 3 is incorporated, utilizes a CPU (not shown) to provide microprocessor control. Upon receipt of an ENABLE signal from the CPU, a transmit trigger block 40 generates trigger pulses 10 (FIG. 1A) occurring at the system pulse repetition frequency (PRF). The system includes a radar transmitter 41 controlled by the transmit trigger signal from the block 40. A programmable delay generator 42 provides coarse range delay by delaying the leading edge of the transmit trigger signal from the block 40. A data bus 43, which provides the communication link between the CPU and the system, controls the time delay of the programmable delay generator 42. Thus, the programmable delay generator 42 delays the leading edge of the transmit trigger signal by a time determined by the CPU.

A programmable delay generator 44 provides fine range delay in the manner described with respect to the coarse range delay programmable delay generator 42. The total time delay of the fine range delay programmable delay generator 44 is preferably equal to one step delay of the coarse range delay programmable delay generator 42. The data bus 43 provides the fine range delay parameter to the block 44 in the same manner as the coarse range delay parameter is provided to the block 42.

A range gate generator 45 determines the actual range gate width via CPU control in a manner to be described. A radar receiver 46 is enabled upon receipt of the range gate provided by the range gate generator 45.

Figure 4:
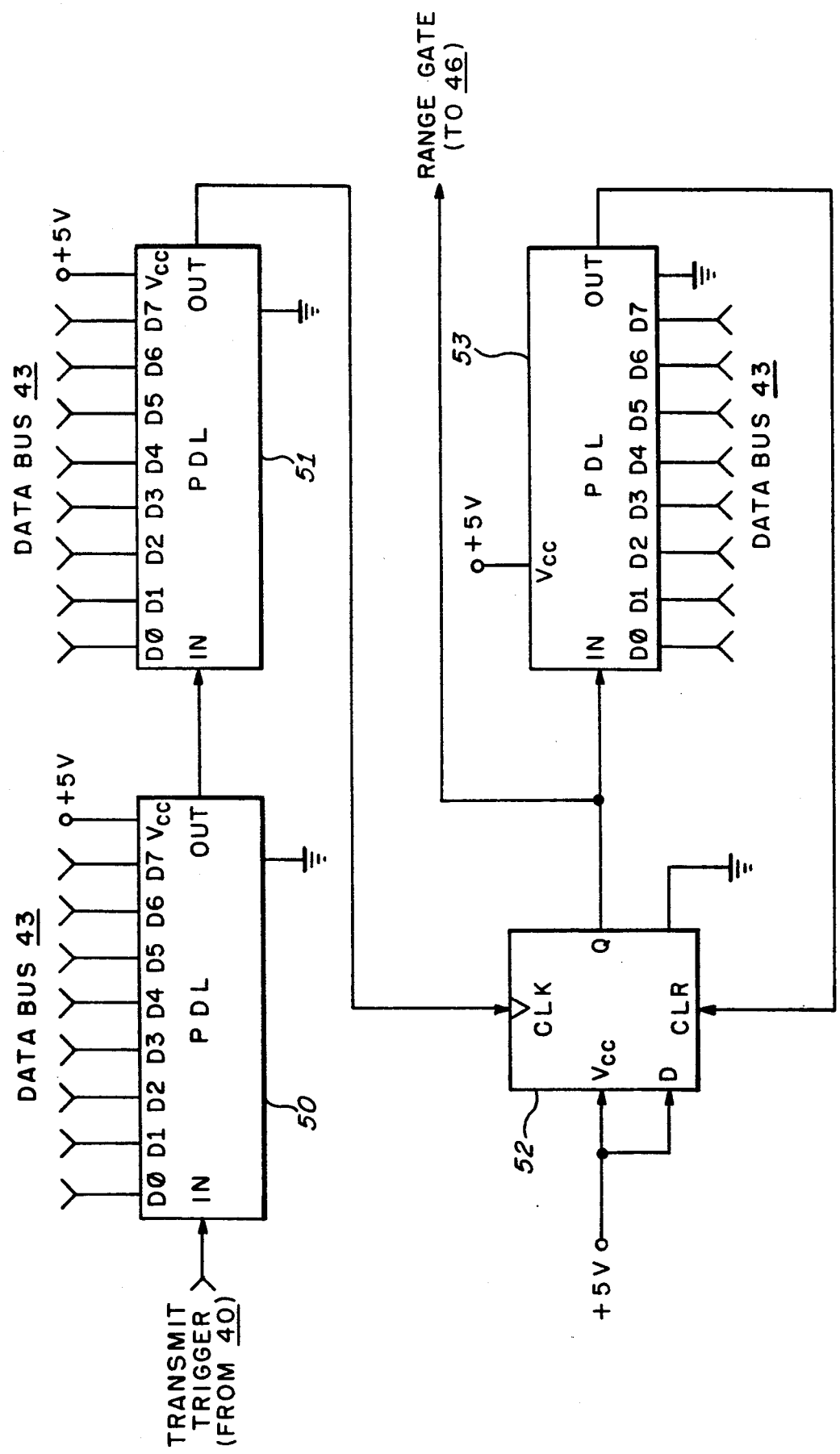
FIG. 4 is a schematic wiring diagram of a variable range gate generator implemented in accordance with the preferred embodiment of the present invention.

Referring to FIG. 4, a schematic wiring diagram of integrated circuits for implementing the range gate timing apparatus of FIG. 3, is illustrated. A programmable delay line (PDL) 50 provides the coarse range delay time and a PDL 51 provides the fine range delay time. A D-type flip-flop 52 and a PDL 53 generate the range gate, with the PDL 53 determining the range gate width. It is appreciated that the PDL 50 implements the coarse range delay programmable delay generator 42 of FIG. 3; the PDL 51 implements the fine range delay programmable delay generator 44; and the flip-flop 52 and PDL 53 implement the range gate generator 45.

The transmit trigger pulse is applied to the PDL 50 which is programmed by the CPU via the data bus 43 to provide the coarse range delay. Preferably, the PDL 50 is an 8-bit device providing up to or 256 steps of delay. The step delay selected depends upon the application. In the preferred implementation embodied in an intrusion detection and alert system, each range bin is selected to be ten feet deep. The PDL 50, therefore, provides a step delay of 20 nanoseconds. The PDL 51 generates the fine range delay and is selected to provide a step delay of one-half nanosecond.

The PDL 51 is utilized to provide two functions, one of which being to provide an offset to null out propagation delays in either the transmitter or the receiver circuitry. Additionally, the PDL 51 can step the range gate in one-half nanosecond increments to provide a range resolution as fine as three inches.

The output from the PDL 51 clocks the flip-flop 52 driving the Q output thereof high, thereby triggering the PDL 53. The PDL 53, after the programmed delay time thereof, clears the flip-flop 52. The range gate is provided by the Q output of the flip-flop 52, the setting and clearing thereof generating the range gate.

Figure 5:
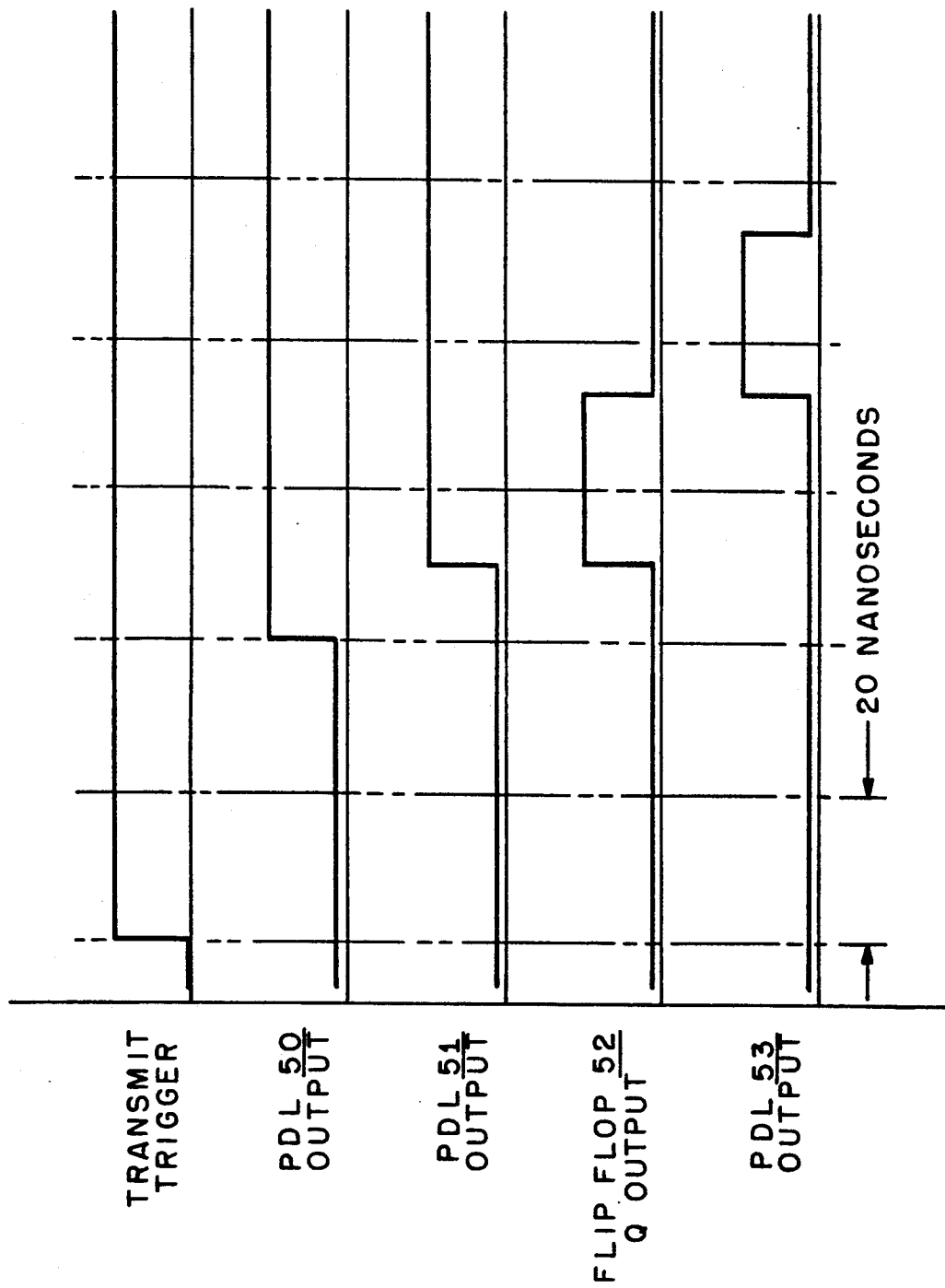
FIG. 5 is a timing diagram illustrating waveforms pertinent to the variable range gate generator of FIG. 4.

Referring to FIG. 5, the relationship between the various signals generated in the circuit of FIG. 4, is illustrated. As shown, the PDL 50 time delay is equal to 40 nanoseconds; the PDL 51 time delay is equal to 10 nanoseconds and the PDL 53 time delay is equal to 22 nanoseconds. Thus, as illustrated, coarse range delay is set for twenty feet (40 nanoseconds), fine range/offset delay is set for five feet (10 nanoseconds) and the range bin width is set for eleven feet (range gate width of 22 nanoseconds).

It is appreciated from the foregoing, that the apparatus utilized in the present invention to generate the range gate delay and range gate width eliminates the high speed, fixed-frequency clocks utilized in the prior art thereby obviating the limitations thereof. Instead, the present invention utilizes programmable delay generators (PDG), preferably implemented by programmable delay lines (PDL), to control these parameters. The microprocessor embedded in the system programs the delay devices 50, 51 and 53 during the system set-up procedure. With such a system, range resolution, number of range bins and range offset can be established either by the operator through a control panel or by software embedded in the system.

Programmable delay lines and programmable delay generators are commercially available with minimum step delays of one-half nanosecond and total delays of 1.28 microseconds. A system implemented utilizing the precepts of the present invention could have a total range exceeding one-quarter mile, with a range resolution of three inches. Three delay lines can be utilized to set coarse range delay, fine range delay and range gate width. Specifically, the PDLs of FIG. 4 are implemented by Data Delay Devices, Inc. P/N's PDU-13256-10M for coarse delay and PDU-13256-.5M for fine delay and range gate width.

Since no clock is utilized, operation is completely asynchronous, all signals generated being initiated by the transmit trigger. In the system of the preferred embodiment, the system control algorithm determines the values loaded into the PDLs for coarse/fine range delay and range gate width. With the present invention, it is no longer necessary to alter the hardware to change the system range gating parameters. Additionally, one hardware arrangement may be utilized to service numerous applications and situations.

In the system of the present invention, the microprocessor determines which range bin to interrogate by loading the appropriate numbers into the range registers which control the PDLs 50, 51 and 53. During set up, additional information is also loaded into other system registers utilized for data gathering. Once all of the registers are set, the microprocessor enables the transmit trigger circuit 40. Once the transmit trigger circuit 40 is enabled, the digital system hardware assumes interrogation of the selected range, after which the digital hardware provides detection data to the CPU for further processing. Based on the control algorithm, the CPU then decides which range to interrogate next.

The present invention may be utilized in an Intrusion Detection And Alert System that provides perimeter security by utilizing impulse radar. The range of detection is divided into bins of equal depth. Short pulses of RF energy are transmitted outwardly at a specific PRF. The transmitted pulses are reflected from targets and acquired by the receiver/detector. The range bins are interrogated by gating the receiver to view target returns from one bin at a time. The two signals utilized to accomplish this function are the range delay signal and the range gate which determine which range bin is interrogated and the depth of the range bin, respectively. By combining programmable delay lines with microprocessor control, the present invention controls and alters the timing of the signals to provide different applications without any change in the hardware.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. In a radar system having a transmitter activated by a trigger pulse and a receiver including range gate generator apparatus for generating a range gate of predetermined width following a controllable time interval after an occurrence of said trigger pulse, said range gate utilized to enable said receiver, said controllable time interval being controllable by a first digital signal, said range gate apparatus comprising first programmable delay line means coupled to receive said trigger pulse and responsive to said first digital signal for propagating said trigger pulse along said first programmable delay line means to delay said trigger pulse in accordance with said first digital signal so as to provide a delayed trigger pulse delayed by said controllable time interval, and range gate generator means coupled to said first programmable delay line means and responsive to said delayed trigger pulse for generating said range gate upon the occurrence of said delayed trigger pulse.

2. The apparatus of claim 1 wherein said predetermined width comprises a controllable width, controllable by a second digital signal, said range gate includes a leading edge and a trailing edge, and said range gate generator means comprises second programmable delay line means responsive to said delayed trigger pulse and to said second digital signal for generating a further delayed pulse in accordance with said second digital signal, said delayed trigger pulse defining said leading edge of said range gate and said further delayed pulse defining said trailing edge of said range gate.

3. The apparatus of claim 2 wherein said range gate generator means further comprises bistable means having an output, said bistable means being coupled to said first programmable delay line means and to said second programmable delay line means, said bistable means being settable to a first state in response to said delayed trigger pulse and resettable to a second state in response to said further delayed pulse, said output of said bistable means providing said range gate.

4. The apparatus of claim 3 wherein said second programmable delay line means has an input and said bistable means comprises a flip-flop having said output thereof coupled to said input of said second programmable delay line means so as to generate said further delayed pulse in response to said delayed trigger pulse.

5. The apparatus of claim 1 wherein said first digital signal comprises a coarse digital signal and a fine digital signal.

6. The apparatus of claim 5 wherein said first programmable delay line means comprises a first programmable delay line coupled to receive said trigger pulse and responsive to said coarse digital signal for propagating said trigger pulse along said first programmable delay line so as to delay said trigger pulse in accordance with said coarse digital signal, and a second programmable delay line coupled in series with said first programmable delay line and responsive to said fine digital signal for propagating said trigger pulse along said second programmable delay line to delay said trigger pulse in accordance with said fine digital signal so as to provide said delayed trigger pulse.

7. The apparatus of claim 2 wherein said second programmable delay line means comprises a programmable delay line.

* * * * *